US008219821B2

(12) United States Patent
Zimmels et al.

(10) Patent No.: US 8,219,821 B2
(45) Date of Patent: Jul. 10, 2012

(54) SYSTEM AND METHOD FOR SIGNATURE BASED DATA CONTAINER RECOGNITION

(75) Inventors: Ori Zimmels, San Francisco, CA (US); Yuval Frandzel, Foster City, CA (US)

(73) Assignee: NetApp, Inc., Sunnyvale, CA (US)

( * ) Notice: Subject to any disclaimer, the term of this patent is extended or adjusted under 35 U.S.C. 154(b) by 1052 days.

(21) Appl. No.: 11/691,862

(22) Filed: Mar. 27, 2007

(65) Prior Publication Data
US 2008/0244270 A1 Oct. 2, 2008

(51) Int. Cl.
H04L 1/00 (2006.01)
(52) U.S. Cl. ........ 713/181; 713/189; 713/165; 713/176; 380/30; 380/28; 380/278; 380/280; 380/1; 380/40; 717/169; 717/170
(58) Field of Classification Search ............ 713/176
See application file for complete search history.

(56) References Cited

U.S. PATENT DOCUMENTS

| | | |
|---|---|---|
| 4,156,907 A | 5/1979 | Rawlings et al. |
| 4,399,503 A | 8/1983 | Hawley |
| 4,570,217 A | 2/1986 | Allen et al. |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,837,675 A | 6/1989 | Bean et al. |
| 4,843,541 A | 6/1989 | Bean et al. |
| 4,864,497 A | 9/1989 | Lowry et al. |
| 4,896,259 A | 1/1990 | Jacobs et al. |
| 4,899,342 A | 2/1990 | Potter et al. |
| 4,916,608 A | 4/1990 | Shultz |
| 4,989,206 A | 1/1991 | Dunphy, Jr. et al. |
| 5,124,987 A | 6/1992 | Milligan et al. |
| 5,129,088 A | 7/1992 | Auslander et al. |

(Continued)

FOREIGN PATENT DOCUMENTS

EP 1480100 A1 11/2004

(Continued)

OTHER PUBLICATIONS

Bitton, Dina, Disk Shadowing, Proceedings of the 14.sup.th VLDB Conference, LA, CA (1988), 8 pages.

(Continued)

Primary Examiner — Nathan Flynn
Assistant Examiner — Bryan Wright
(74) Attorney, Agent, or Firm — Cesari and McKenna, LLP

(57) ABSTRACT

A system and method for signature based data container recognition is provided. When a new data container, such as a lun, is created, a security appliance generates a signature of the data container, by, e.g., examining the contents of one or more data blocks of the data container. The generated signature is then associated with the appropriate encryption key for the data container and is stored either within a configuration database of the security appliance or on a key management system operating within a security appliance environment. To identify the encryption key associated with a data container, the security appliance generates a signature of the data container and compares the generated signature with the stored signatures. Should there be a matching signature, the security appliance utilizes the encryption key associated with the matching signature to process data access requests to/from the data container.

20 Claims, 6 Drawing Sheets

U.S. PATENT DOCUMENTS

| | | | |
|---|---|---|---|
| RE34,100 E | 10/1992 | Hartness | |
| 5,155,835 A | 10/1992 | Belsan | |
| 5,163,131 A | 11/1992 | Row et al. | |
| 5,202,979 A | 4/1993 | Hillis et al. | |
| 5,278,979 A | 1/1994 | Foster et al. | |
| 5,355,453 A | 10/1994 | Row et al. | |
| 5,426,747 A | 6/1995 | Weinreb et al. | |
| 5,485,579 A | 1/1996 | Hitz et al. | |
| 5,511,177 A | 4/1996 | Kagimasa et al. | |
| 5,568,629 A | 10/1996 | Gentry et al. | |
| 5,581,724 A | 12/1996 | Belsan et al. | |
| 5,764,972 A | 6/1998 | Crouse et al. | |
| 5,802,366 A | 9/1998 | Row et al. | |
| 5,819,292 A | 10/1998 | Hitz et al. | |
| 5,828,876 A | 10/1998 | Fish et al. | |
| 5,832,513 A | 11/1998 | Kennedy | |
| 5,870,734 A | 2/1999 | Kao | |
| 5,897,661 A | 4/1999 | Baranovsky et al. | |
| 5,907,672 A | 5/1999 | Matze et al. | |
| 5,918,229 A | 6/1999 | Davis et al. | |
| 5,931,918 A | 8/1999 | Row et al. | |
| 5,941,972 A | 8/1999 | Hoese et al. | |
| 5,944,789 A | 8/1999 | Tzelnic et al. | |
| 5,963,962 A | 10/1999 | Hitz et al. | |
| 5,987,477 A | 11/1999 | Schmuck et al. | |
| 6,038,570 A | 3/2000 | Hitz et al. | |
| 6,061,770 A | 5/2000 | Franklin | |
| 6,081,875 A | 6/2000 | Clifton et al. | |
| 6,128,627 A | 10/2000 | Mattis et al. | |
| 6,173,293 B1 | 1/2001 | Thekkath et al. | |
| 6,173,374 B1 | 1/2001 | Heil et al. | |
| 6,185,655 B1 | 2/2001 | Peping | |
| 6,240,527 B1 | 5/2001 | Schneider et al. | |
| 6,341,341 B1 | 1/2002 | Grummon et al. | |
| 6,397,311 B1 | 5/2002 | Capps | |
| 6,457,021 B1 | 9/2002 | Berkowitz et al. | |
| 6,516,380 B2 | 2/2003 | Kenchammana-Hoskote et al. | |
| 6,571,261 B1 | 5/2003 | Wang-Knop et al. | |
| 6,606,690 B2 | 8/2003 | Padovano | |
| 6,618,798 B1 | 9/2003 | Burton et al. | |
| 6,636,879 B1 | 10/2003 | Doucette et al. | |
| 6,643,654 B1 | 11/2003 | Patel et al. | |
| 6,671,773 B2 | 12/2003 | Kazar et al. | |
| 6,721,764 B2 | 4/2004 | Hitz et al. | |
| 6,732,124 B1 | 5/2004 | Koseki et al. | |
| 6,804,706 B2 | 10/2004 | Pitts | |
| 6,868,417 B2 | 3/2005 | Kazar et al. | |
| 6,978,283 B1 | 12/2005 | Edwards et al. | |
| 7,055,058 B2 | 5/2006 | Lee et al. | |
| 7,107,385 B2 | 9/2006 | Rajan et al. | |
| 7,127,577 B2 | 10/2006 | Koning et al. | |
| 7,194,597 B2 | 3/2007 | Willis et al. | |
| 7,231,412 B2 | 6/2007 | Hitz et al. | |
| 7,334,095 B1 | 2/2008 | Fair et al. | |
| 7,409,494 B2 | 8/2008 | Edwards et al. | |
| 7,409,511 B2 | 8/2008 | Edwards et al. | |
| 7,430,571 B2 | 9/2008 | Edwards et al. | |
| 7,590,807 B2 | 9/2009 | McGovern et al. | |
| 2002/0194484 A1* | 12/2002 | Bolosky et al. | 713/189 |
| 2004/0030668 A1 | 2/2004 | Pawlowski et al. | |
| 2004/0064485 A1 | 4/2004 | Yoshida | |
| 2004/0153642 A1* | 8/2004 | Plotkin et al. | 713/150 |
| 2005/0013441 A1* | 1/2005 | Klein | 380/278 |
| 2006/0179327 A1 | 8/2006 | Musa | |
| 2006/0184587 A1 | 8/2006 | Federwisch et al. | |
| 2007/0079126 A1* | 4/2007 | Hsu et al. | 713/176 |
| 2007/0088702 A1 | 4/2007 | Fridella et al. | |

FOREIGN PATENT DOCUMENTS

| | | |
|---|---|---|
| JP | 2004126639 | 4/2004 |
| WO | WO 89/10594 | 11/1989 |

OTHER PUBLICATIONS

Chutani, Sailesh, et al., The Episode File System, In Proceedings of the USENIX Winter 1992, 18 pages.

Finlayson, Ross S., et al., Log Files: An Extended File Service Exploiting Write-Once Storage Department of Computer Science, Stanford University, Report No. STAN-CS-87-1177, Sep. 1987, 14 pages.

Gait, Jason, Phoenix: A Safe In-Memory File System. Communications of the ACM, 33(1): pp. 81-86, Jan. 1990.

Hitz, Dave et al., File System Design for an NFS File Server Appliance, Technical Report 3002, Rev. C395, presented Jan. 19, 1994, 23 pages.

Howard, John H., An Overview of the Andrew File System, Carnegie Mellon University, CMU-ITC-88-062 1988, 6 pages.

Howard, John H, et al., Scale and Performance in a Distributed File System, Carnegie Mellon University, CMU-ITC-87-068, Aug. 5, 1987, 33 pages.

Howard, John, H. et al., Scale and performance in a distributed file system, ACM Trans. Computer. System., 6(1), Feb. 1988 pp. 51-81.

Kazar, Michael L., et al., Decorum File System Architectural Overview, USENIX Summer Conference, Anaheim, California, 1990, 13 pages.

Kazar, Michael L., Synchronization and Caching Issues in the Andrew File System, Carnegie Mellon University, CMU-ITC-88-063, 12 pages.

Kistler, et al., Disconnected Operation in the Coda File System, ACM Transactions on Computer Systems, vol. 10, No. 1, Feb. 1992, pp. 3-25.

Lorie, Raymond, A, Physical Integrity in a large segmented database, ACM Trans. Database Systems, 2(1): 91-104, Mar. 1977.

Lorie, RA, Shadow Page Mechanism, IBM Technical Disclosure Bulletin, Jun. 1986, pp. 340-342.

McKusick, Marshall Kirk, et al., A Fast File System for UNIX, Computer Science Division, Department of Electrical Engineering and Computer Sciences, Univ. of CA, Berkley, Feb. 18, 1994, 14 pages.

Ousterhout, John K. et al., The Sprite Network Operating System, Computer Science Division, Department of Electrical Engineering and Computer Sciences, Univ. of CA, Berkley, Nov. 19, 1987, 32 pages.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.

Ousterhout, John, Why Aren't Operating Systems Getting Faster as Fast as Hardware?, Digital WRL Technical Note TN-11, Oct. 1989, 20 pages.

Ousterhout, John, A Brief Retrospective on the Sprite Network Operating System, found at http://www.cs.berkeley.edu/projects/sprite/retrospective.html.visited on Mar. 11, 2005, 5 pages.

Patterson, D., et al., A Case for Redundant Arrays of Inexpensive Disks (RAID), Technical Report, CSD-87-391, Computer Science Division, Electrical Engineering and Computer Sciences, University of California at Berkeley (1987), 26 pages.

Patterson, D., et al., A Case for Redundant Arrays of Inexpensive Disks (RAID), SIGMOD International Conference on Management of Data, Chicago, IL, USA, Jun. 1-3, 1988, SIGMOD Record (17):3:109-16 (Sep. 1988).

Peterson, Zachary Nathaniel Joseph, Data Placement for Copy-on-Write Using Virtual Contiguity, University of CA, Santa Cruz, Master of Science in Computer Science Thesis, Sep. 2002.

Quinlan, Sean, A Cached WORM File System, Software-Practice and Experience, 21(12):1289-1299 (1991).

Rosenberg, J., et al., Stability in a Persistant Store Based on a Large Virtual Memory, In Security and Persistence, Rosenber, J. & Keedy, J.L. (ed), Springer-Verlag (1990) pp. 229-245.

Rosenblum, Mendel, et al. The Design and Implementation of a Log-Structured File System Jul. 24, 1991 pp. 1-15.

Rosenblum, Mendel, The Design and Implementation of a Log-Structured File System, 1992, pp. 1-93.

Rosenblum, Mendel, et al., The Design and Implementation of a Log-Structured File System, In Proceedings of ACM Transactions on Computer Systems, (10)1:26-52, Feb. 1992.

Rosenblum, Mendel, et al., The LFS Storage Manager, Computer Science Division, Electrical Engin. and Computer Sciences, Univ. of CA, presented at Summer '90 USENIX Technical Conference, Anaheim, CA Jun. 1990, 16 pages.

Santry, Douglas S., et al., Deciding When to Forget in the Elephant File System, Operating Systems Review, 34(5), (Dec. 1999) pp. 110-123.

Satyanarayanan, M., et al., The ITC Distributed File System: Principles and Design, In Proceedings of the 10th ACM Symposium on Operating Systems Principles, (19)5:56-67, Dec. 1985.

Satyanarayanan, M., A survey of distributed file-systems. Annual Review of Computing Science, 4(73-104), 1989.

Satyanarayanan, M., et al., Coda: A highly available file system for a distributed workstation environment Carnegie Mellon University, CMU-ITC.

Satyanarayanan, M., et al., Coda: A highly available file system for a distributed workstation environment. IEEE Transactions on Computers, 39(4):447-459, 1990.

Satyanarayanan, M., Scalable, Secure, and Highly Available Distributed File Access, Computer May 1990: 9-21.

Seltzer, Margo I., et al., Journaling Versus Soft Updates: Asynchronous Meta-Data Protection in File Systems, Proceedings of 200 USENIX Annual Technical Conference, Jun. 18-23, 2000.

Sidebotham, Bob, Volumes: The Andrew File System Data Structuring Primitive, EEUG Conference Proceedings, Manchester, UK, Autumn 1986.

West, Michael, et al. The ITC Distributed File System: Prototype and Experience, Carnegie-Mellon University, Technical Report CMU-ITC-040, Mar. 1985, 17 pages.

Zayas, Edward R., AFS-3 Programmer's Reference: Architectural Overview, Transarc Corporation, Pittsburgh, PA, 1.0 edition 1991, 37 pages.

Kaplan, Marc A., "IBM Cryptolopes, SuperDistribution and Digital Rights Management," IBM Corporation, Dec. 30, 1996, XP-02286232, Retrieved from the Internet: http://www.research.ibm.com/people/k/kaplan/cryptolope-docs/crypap.html, retrieved on Jun. 25, 2004, pp. 1-8.

"Notification of Transmittal of the International Search Report and the Written Opinion of the International Searching Authority, or the Declaration," International Filing Date: Mar. 20, 2008, International Application No. PCT/US2008/003696, Applicant: Network Appliance, Inc., Date of Mailing: Jul. 14, 2008, pp. 1-14.

M. A. Kaplan, "IBM Cryptolopes, Super Distribution and Digital Rights Management" Retrieved from internet Jun. 25, 2004 by ISA, http://www.research.ibm.com/people/k/kaplan/cryptolope-docs/crypap.html.

* cited by examiner

SYSTEM AND METHOD FOR SIGNATURE BASED DATA CONTAINER RECOGNITION

FIELD OF THE INVENTION

The present invention relates to security appliances, and more specifically, to signature based data container recognition by a security appliance.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may include an operating system that implements a file system to logically organize the information as a hierarchical structure of data containers, such as files on, e.g., the disks. Each "on-disk" file may be implemented as a set of data structures, e.g., disk blocks, configured to store information, such as the actual data (i.e., file data) for the file.

The storage system may be further configured to operate according to a client/server model of information delivery to thereby allow many client systems (clients) to access shared resources, such as files, stored on the storage system. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the storage system by exchanging discrete frames or packets of data according to pre-defined protocols, such as the Transmission Control Protocol/Internet Protocol (TCP/IP).

In the client/server model, the client may comprise an application executing on a computer that "connects" to the storage system over a computer network, such as a point-to-point link, shared local area network, wide area network or virtual private network implemented over a public network, such as the Internet. NAS systems generally utilize file-based access protocols; therefore, each client may request the services of the storage system by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS) and the Network File System (NFS) protocols, the utility of the storage system may be enhanced for networking clients.

A SAN is a high-speed network that enables establishment of direct connections between a storage system and its storage devices. The SAN may thus be viewed as an extension to a storage bus and, as such, an operating system of the storage system enables access to stored data using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (e.g., FCP) or TCP (iSCSI).

SCSI is a peripheral input/output (I/O) interface with a standard, device independent protocol that allows different peripheral devices, such as disks, to attach to a storage system. In SCSI terminology, clients operating in a SAN environment are "initiators" that initiate commands and requests to access data. The storage system is thus a "target" configured to respond to the data access requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

A SAN arrangement or deployment allows decoupling of storage from the storage system, such as an application server, and some level of information storage sharing at the storage system level. There are, however, environments wherein a SAN is dedicated to a single storage system. In some SAN deployments, the information is organized in the form of databases, while in others a file-based organization is employed. Where the information is organized as files, the client requesting the information maintains file mappings and manages file semantics, while its requests (and storage system responses) address the information in terms of block addressing on disk using, e.g., a logical unit number (lun).

A network environment may be provided wherein information (data) is stored in secure storage served by one or more storage systems coupled to one or more security appliances. Each security appliance is configured to transform unencrypted data (cleartext) generated by clients (or initiators) into encrypted data (ciphertext) destined for secure storage or "cryptainers" on the storage system (or target). As used herein, a cryptainer is a piece of storage on a storage device, such as a disk, in which the encrypted data is stored. In the context of a SAN environment, a cryptainer can be, e.g., a disk, a region on the disk or several regions on one or more disks that, in the context of a SAN protocol, is accessible as a lun. In the context of a NAS environment, the cryptainer may be a collection of files on one or more disks. Specifically, in the context of the CIFS protocol, the cryptainer may be a share, while in the context of the NFS protocol, the cryptainer may be a mount point. In a tape environment, the cryptainer may be a tape containing a plurality of tape blocks.

Each cryptainer is associated with its own encryption key, e.g., a cryptainer key, which is used by the security appliance to encrypt and decrypt the data stored on the cryptainer. An encryption key is a code or number which, when taken together with an encryption algorithm, defines a unique transformation used to encrypt or decrypt data. Data remains encrypted while stored in a cryptainer until requested by an authorized client. At that time, the security appliance retrieves the encrypted data from the cryptainer, decrypts it and forwards the unencrypted data to the client.

A storage system typically exports one or more luns for use by a client to utilize storage space for one or more applications, such as Microsoft Exchange. In such environments, the client overlays a file system onto the storage space provided by the luns exported by the storage system and the application stores one or more files or other data containers on the file system. A security appliance may be interposed between the client and the storage system to ensure that the data stored on the luns is encrypted. However, a noted disadvantage arises in that an administrator must track which encryption keys are associated with a particular lun. This may become problematic when, e.g., a particular lun is migrated from one storage system to another, a lun is backed up and then restored to a different storage system after, e.g., a failure of a storage system, etc. Furthermore, in storage systems that support generation of point in time images, such as snapshots or persistent consistency point images (PCPIs), a PCPI may be restored to an active file system, thereby resulting in a new lun being exported.

A trivial solution to maintaining and tracking appropriate encryption keys is to require that all luns in storage system installation share a common encryption key. However should the single key be compromised, an obvious disadvantage of such a solution is that all of the luns of the installation are similarly vulnerable to compromise. Furthermore, a single storage system may host data from a plurality of different entities which may not have a complete trust relationship among the entities. For example, in a storage service provider (SSP) environment, a single storage system may host luns for a variety of differing companies or other business entities which may be competitors. By having common encryption keys among the various luns, security is compromised among the various business entities.

Another potential solution is to utilize metadata stored in arbitrary blocks of a lun to track the plurality of encryption keys. However, a noted disadvantage of such an implementation is that, depending on where clients desire to store data, it may not be possible to store the metadata in arbitrary locations. Thus, storing the metadata may potentially overwrite client stored data.

SUMMARY OF THE INVENTION

The disadvantages of the prior art are overcome by providing a system and method for signature based data contexts of recognition. When a new data container, such as a lun, is created, a security appliance generates a signature of the data container by, e.g., examining the contents of one or more data blocks of the data container. By examining the contents of one or more blocks it is generally meant that the encrypted contents of the blocks is read. Thus, by generating a signature of a data container it is meant generally to read the contents of one or more blocks of the data container and to use the contents of the read blocks as the signature of the data container. By utilizing the encrypted contents of the block(s), a higher probability of uniqueness is obtained as compared to examining the unencrypted contents as, e.g., blocks having identical plaintext will have differing ciphertext contents. Alternately, the data contents of one or more blocks of the data container may be processed by, e.g., using a hashing function on the contents to generate the signature. The generated signature is then associated with an encryption key for the data container and the signature and associated encryption key are stored within a configuration database of the security appliance or on a key management system operating within a security appliance environment. Whenever data in any of the one or more blocks utilized as the signature is modified, a new signature is created and the updated signature is stored by the security appliance.

To identify the encryption key associated with a data container, the security appliance generates a signature of the data container and compares the generated signature with the stored signatures. Should there be a matching signature, the security appliance utilizes the encryption key associated with the matching signature to process data access requests to/from the data container. A match may occur among all of the blocks comprising the signature, or in alternate embodiments, a match may occur when a portion or subset of the blocks match. In this way, the data container is made "self-describing" by utilizing its signature as an index to identify the appropriate encryption key to be used therewith.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Security Appliance Environment

Figure 1:
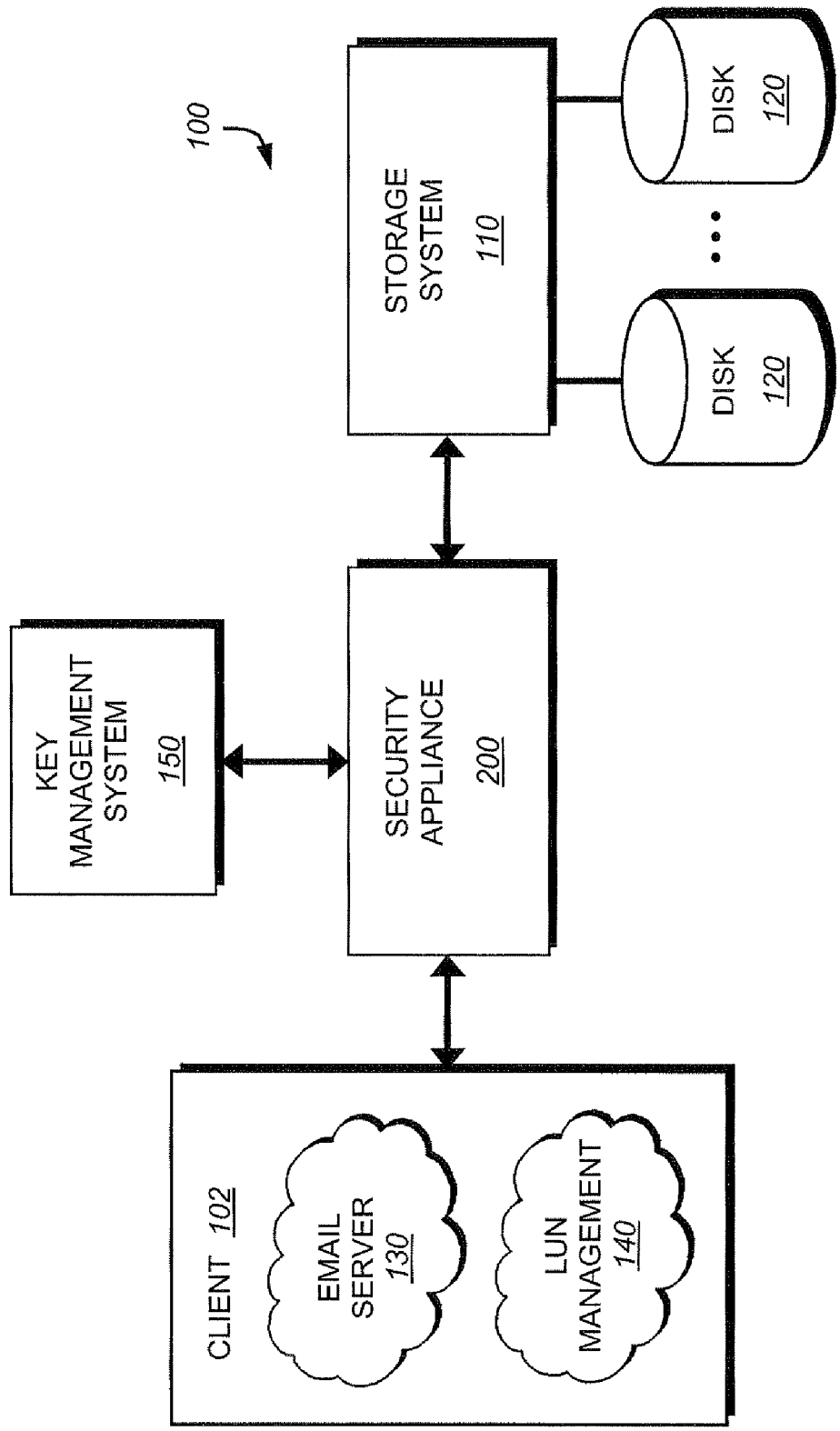
FIG. 1 is a schematic block diagram of an environment including a multi-protocol security appliance that may be advantageously used with the present invention.

FIG. 1 is a schematic block diagram of an environment 100 including a security appliance 200 that may be advantageously used with the present invention. The security appliance 200 is coupled between one or more clients 102 and one or more storage systems 110. The security appliance 200, which is configured to act as an encryption proxy, intercepts a data access request issued by client 102 and destined for the storage system 110, wherein the data access request may be a read request to retrieve certain data stored on storage devices, such as disks 120, coupled to the storage system 110 or a write request to store data on the disks. In the case of a write request, the security appliance 200 intercepts the request, encrypts the data associated with the request and forwards the encrypted data to the storage system 110 for storage at a specified location (address) on disk 120. In the case of a read request, the security appliance intercepts the request and forwards it onto the storage system, which returns the requested data to the appliance in encrypted form. The security appliance 200 then decrypts the encrypted data and returns the decrypted data to the client 102.

In the illustrative embodiment, the security appliance employs a conventional encryption algorithm, e.g., the Advanced Encryption Standard (AES) or other appropriate algorithms, to transform unencrypted data (cleartext) generated by the clients 102 into encrypted data (ciphertext) intended for secure storage, i.e., one or more cryptainers, on the storage system 110. The encryption and decryption operations are performed using encryptions keys, such as a cryptainer key associated with each cryptainer. As described herein, the security appliance 200 uses an appropriate cryptainer key to encrypt or decrypt portions of data stored in a particular cryptainer. In addition to performing encryption and decryption operations, the security appliance 200 also performs access control, authentication, virtualization, and secure-logging operations.

Environment 100 also includes a key management system 150 that may be utilized by the security appliance 200 for storage of signature data structures 400 (FIG. 4) in accordance with an illustrative embodiment of the present invention. The key management system 150 is described further below.

Illustratively, the client 102 may include a management process 140 that manages exported luns from the storage system 110. In one illustrative embodiment, the management process comprises the SnapDrive® for Windows product available from Network Appliance, Inc. of Sunnyvale, Calif. However, it is expressly contemplated that other lun management software may be utilized. Furthermore, the client 102 may include an e-mail server 130 that utilizes the exported luns from the storage system 110. The email server is illustratively a Microsoft Exchange server; however, it should be noted that the description of a client 102 executing an e-mail server utilizing lun management software 140 is exemplary only. As such, the teachings of the present invention should be read to cover other forms of clients and/or data containers utilized within a storage and security appliance environment.

B. Security Appliances

Figure 2:
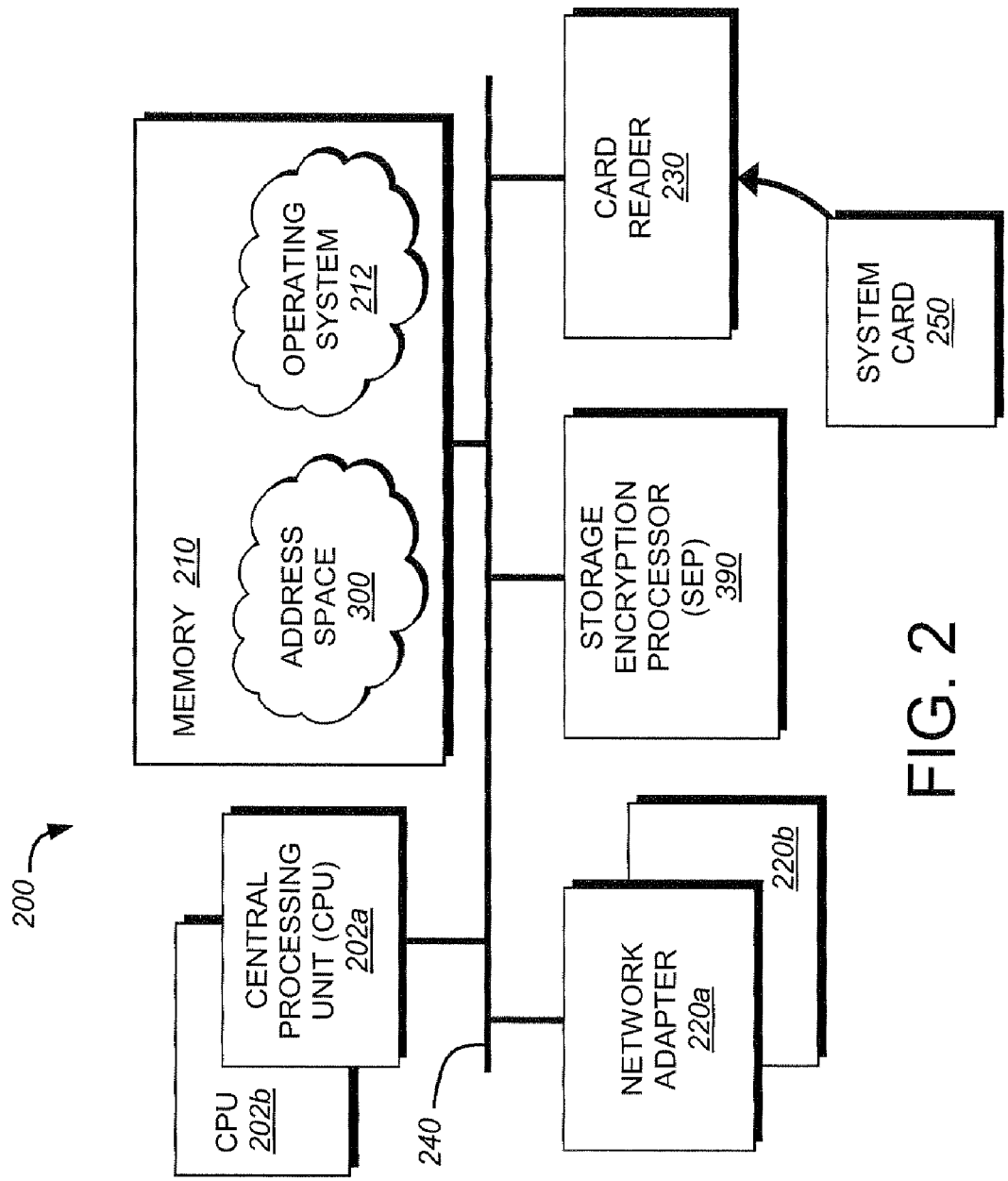
FIG. 2 is a schematic block diagram of the multi-protocol security appliance that may be advantageously used with the present invention.

FIG. 2 is a schematic block diagram of the multi-protocol security appliance 200 that may be advantageously used with the present invention. As used herein, a security appliance denotes a computer having features such as simplicity of security service management for users (system administrators) and clients of network attached storage (NAS) and storage area network (SAN) deployments. The security appliance comprises one or more processors, e.g., central processing units (CPU 202*a,b*), a memory 210, one or more network adapters 220*a,b*, a storage encryption processor (SEP 390) and a card reader 230 interconnected by a system bus 240, such as a conventional Peripheral Component Interconnect (PCI) bus. The SEP 390 is configured to perform all encryption and decryption operations for the security appliance in a secure manner; for example, the SEP is configured to protect plaintext encryption keys from system software executing on each CPU 202. Accordingly, the SEP is illustratively embodied as a FIPS certified module that is mounted onto a dedicated interface card or other similar card.

The network adapters 220 couple the security appliance 200 between one or more clients 102 and one or more storage systems 110 over point-to-point links, wide area networks, virtual private networks implemented over a public network (Internet) or shared local area networks. In a SAN environment configured to support various Small Computer Systems Interface (SCSI)-based data access protocols, including SCSI encapsulated over TCP (iSCSI) and SCSI encapsulated over FC (FCP), the network adapters 220 may comprise host bus adapters (HBAs) having the mechanical, electrical and signaling circuitry needed to connect the appliance 200 to, e.g., a FC network. In a NAS environment configured to support, e.g., the conventional Common Internet File System (CIFS) and the Network File System (NFS) data access protocols, the network adapters 220 may comprise network interface cards (NICs) having the mechanical, electrical and signaling circuitry needed to connect the appliance to, e.g., an Ethernet network.

The memory 210 illustratively comprises storage locations that are addressable by the processors and adapters for storing software programs and data structures associated with the present invention. The processor and adapters may, in turn, comprise processing elements and/or logic circuitry configured to execute the software programs and manipulate the data structures. An operating system 212, portions of which is typically resident in memory and executed by the processing elements, functionally organizes the appliance 200 by, inter alia, invoking security operations in support of software processes and/or modules implemented by the appliance. It will be apparent to those skilled in the art that other processing and memory means, including various computer readable media, may be used for storing and executing program instructions pertaining to the invention described herein.

Figure 3:
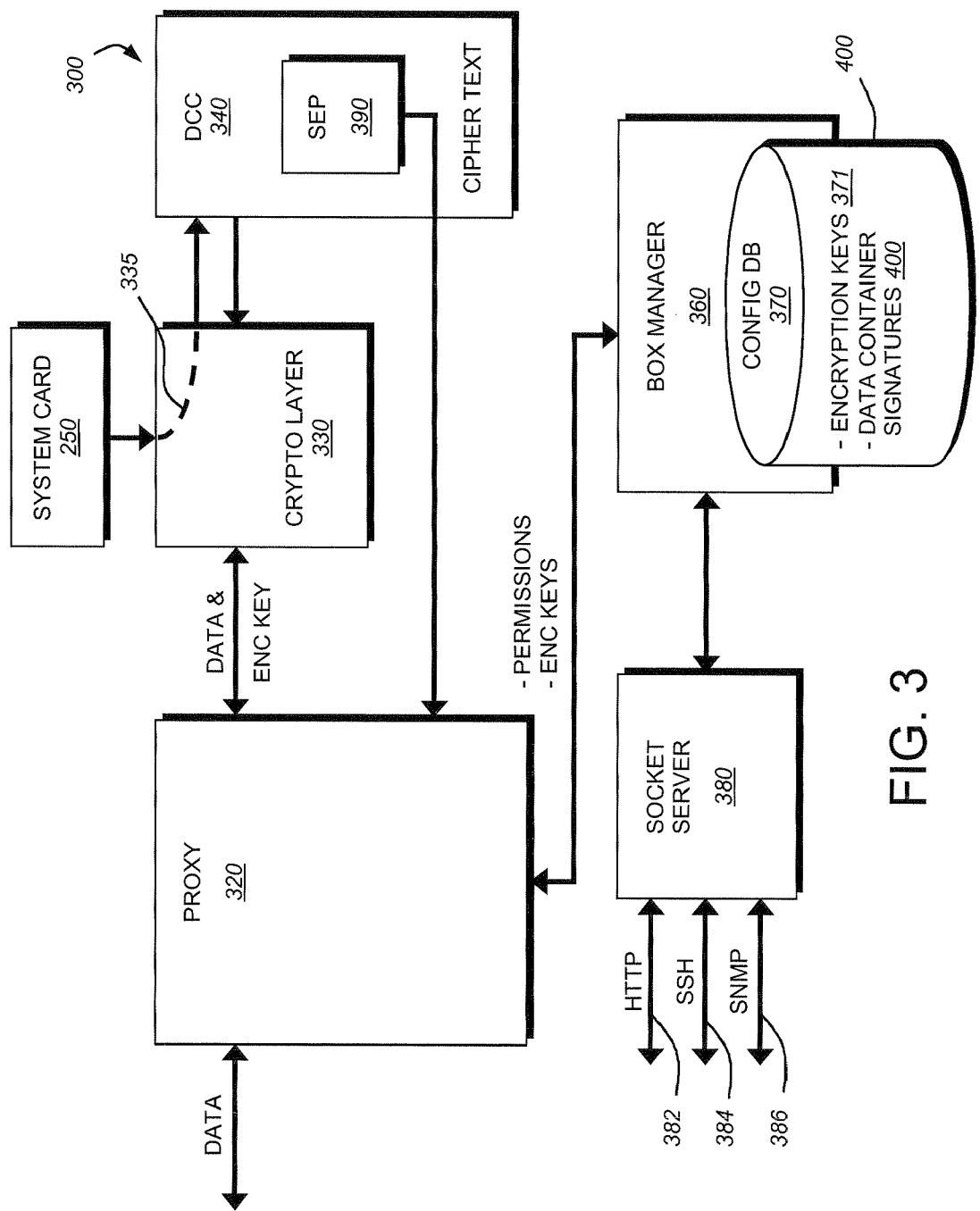
FIG. 3 is a schematic diagram illustrating an arrangement of software processes and modules executing on the security appliance in accordance with an illustrative embodiment of the present invention.

The operating system 212 illustratively organizes the memory 210 into an address space arrangement available to the software processes and modules executing on the processors. FIG. 3 is a schematic diagram illustrating an arrangement 300 of software processes and modules executing on the security appliance 200 in accordance with an illustrative embodiment of the present invention. In the illustrative embodiment, the operating system software is a customized version of a Unix type operating system, although other operating systems may be used.

For both NAS and SAN environments, data is received at a proxy 320 of the security appliance. The proxy 320 is illustratively embodied as, e.g., a network protocol stack configured to interpret the protocol over which data is received and to enforce certain access control rules based on one or more policies. Each policy is served by a box manager 360. The box manager 360 is illustratively embodied as a database application process configured to manage a configuration repository or database (Config DB 370) that stores, e.g., encryption keys 371 and/or data container signature data structures 400. A socket server 380 provides interfaces to the box manager 360, including (i) an HTTP web interface 382 embodied as, e.g., a graphical user interface (GUI) adapted for web-based administration, (ii) a SSH interface 384 for command line interface (CLI) command administration, and (iii) an SNMP interface 386 for remote management and monitoring.

Specifically, the box manager 360 supplies the permissions and encrypted keys to the proxy 320, which intercepts data access requests and identifies the sources (clients 102) of those requests, as well as the types of requests and the storage targets (cryptainers) of those requests. The proxy also queries the box manager for permissions associated with each client and, in response, the box manager 360 supplies the appropriate permissions and encrypted key (e.g., a cryptainer key). In the illustrative embodiment, the box manager implements the novel signature based data container recognition technique of the present invention. The proxy 320 then bundles the data together with the encrypted key and forwards that information to a crypto process (layer) 330 that functions as a "wrapper" for the SEP 390. As noted, the SEP resides on an interface card, which is hereinafter referred to a data crypto card (DCC 340).

The crypto layer 330 interacts with the DCC 340 by accessing (reading and writing) registers on the DCC and, to that end, functions as a PCI interface. Illustratively, a descriptor queue is used by the crypto layer to access the DCC by, e.g., supplying starting and ending points of data, as well as offsets into the data and the encrypted keys used to encrypt the data. The DCC 340 includes one or more previously loaded keys used to decrypt the supplied encrypted keys; upon decrypting an encrypted key, the DCC uses the decrypted key to encrypt the supplied data. Upon completion of encryption of the data, the DCC returns the encrypted data as ciphertext to the proxy 320, which forwards the encrypted data to the storage system 110.

Notably, the security appliance 200 "virtualizes" storage such that, to a client 102, the appliance appears as a storage system 110 whereas, from the perspective of the storage system, the security appliance appears as a client. Such virtualization requires that security appliance manipulate (IP) addresses with respect to data access requests and responses. Illustratively, certain of the customizations to the network protocol stack of the proxy 320 involve virtualization optimizations provided by the appliance. For example, the security appliance 200 manipulates (changes) the source and destination IP addresses of the data access requests and responses.

C. Signature Based Data Container Recognition

The present invention provides a system and method for signature based data container recognition. When a new data container, such as a lun, is created, a security appliance generates a signature of the data container by, e.g., examining the contents of one or more data blocks of the data container. By examining the contents of one or more blocks it is generally meant that the encrypted contents of the blocks is read. Thus, by generating a signature of a data container it is meant generally to read the contents of one or more blocks of the data container and to use the contents of the read blocks as the signature of the data container. By utilizing the encrypted contents of the block(s), a higher probability of uniqueness is obtained as compared to examining the unencrypted contents as, e.g., blocks having identical plaintext will have differing ciphertext contents Alternately, the data contents of one or more blocks of the data container may be processed by, e.g., using a hashing function on the contents to generate the signature. The generated signature is then associated with an encryption key for the data container and the signature and associated encryption key are stored either within a configuration database of the security appliance or on a key management system operating within a security appliance environment. Whenever data in any of the one or more blocks utilized as the signature is modified, a new signature is created and the updated signature is stored by the security appliance.

To identify the encryption key associated with a data container, the security appliance generates a signature of the data container and compares the generated signature with the stored signatures. Should there be a matching signature, the security appliance utilizes the encryption key associated with the matching signature to process data access requests to/from the data container. A match may occur among all of the blocks comprising the signature, or in alternate embodiments, a match may occur when a portion or subset of the blocks match. In this way, the data container is made self describing by utilizing its signature as an index to identify the appropriate encryption key to be used therewith. By self describing it is meant generally that the data container contains within itself the necessary information, i.e., its signature, to identify which encryption key is to be used in association with the data container.

Figure 4:
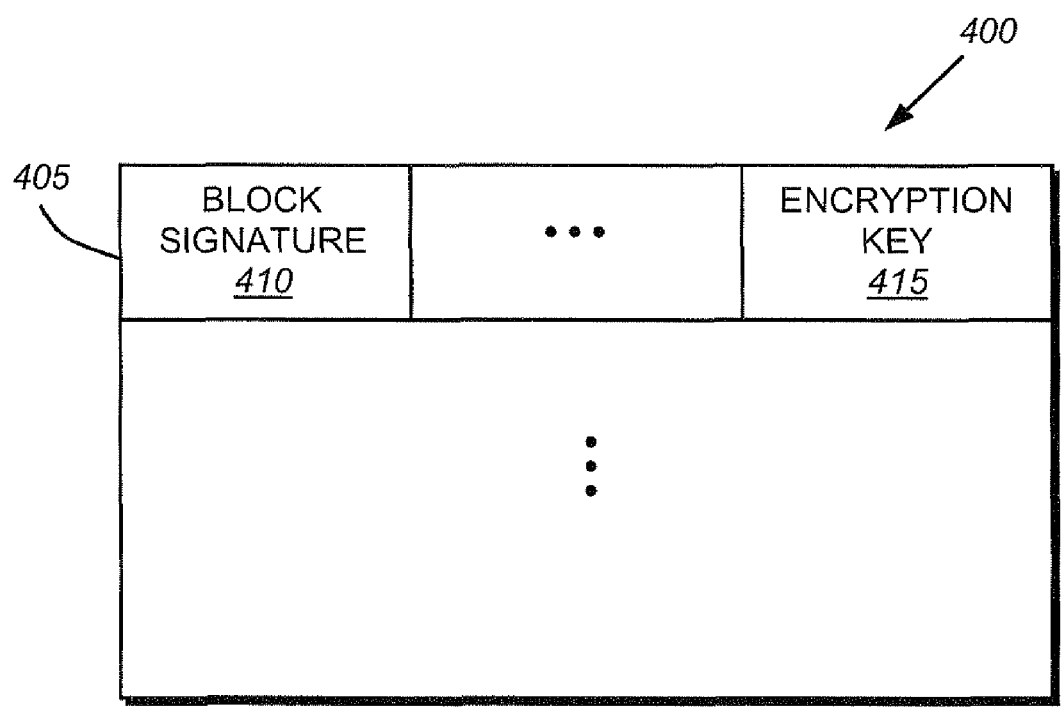
FIG. 4 is a schematic block diagram of an exemplary signature table data structure in accordance with an illustrative embodiment of the present invention.

FIG. 4 is a schematic block diagram of an exemplary data container signature data structure 400 in accordance with an illustrative embodiment of the present invention. Illustratively, data container signature data structures 400 are stored by the box manager 360 in the configuration database 370. In alternate embodiments, data container signature data structure 400 may be stored on key management system 150. The data container signature data structure 400 includes a plurality of entries 405, each of which includes one or more block signature fields 410 and an encryption key field 415. Each block signature field 410 contains the signature of a block of the data container. Illustratively, each block signature field 410 may contain the data of a predetermined block of the data container or the processed content of a particular block of the data container. For example, the data within a block of a data container may be hashed using a conventional hash function and the resulting hash value stored within a block signature field 410.

In one embodiment of the present invention, a match occurs when the contents of a data container being examined match all of the block signature fields 410; however, in alternate embodiments, a match may occur when the contents of the data container being examined match a portion or subset, e.g. X of Y of the block signature fields 410. For example, if a data container being examined matches two of the three block signature fields 410, the security appliance may declare that a match has occurred. The encryption key field 415 contains the encryption key associated with the entry 405. As described further below, when a data container that matches the block signatures fields 410 is identified, the encryption key from the encryption key field 415 is utilized by the security appliance for encrypting operations to/from the data container.

Figure 5:
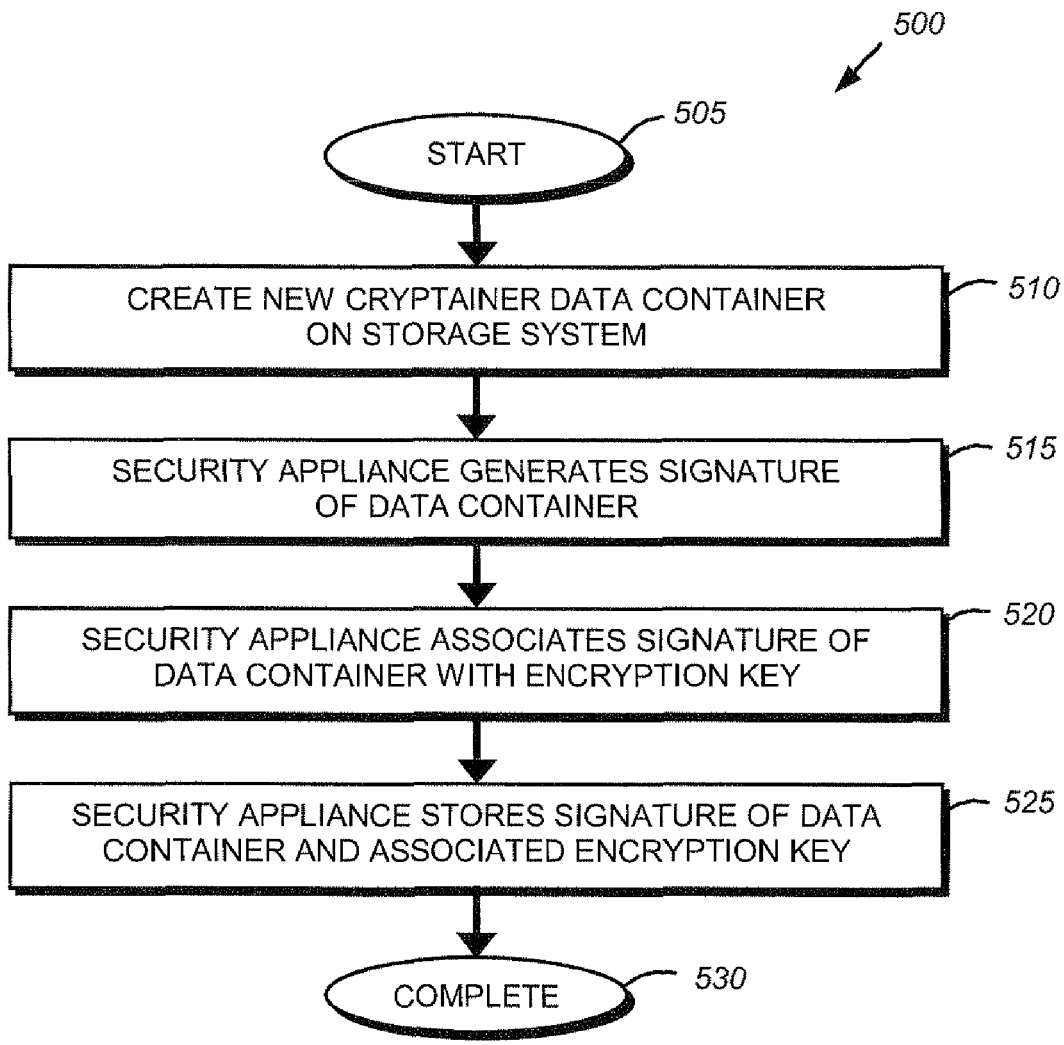
FIG. 5 is a flowchart detailing the steps of a procedure for generating a signature in accordance with an illustrative embodiment of the present in pension.

FIG. 5 is a flowchart detailing the steps of a procedure 500 for generating the signature of a data container in accordance with an illustrative embodiment of the present invention. The procedure 500 begins in step 505 and continues to step 510 where a new data container is created on a storage system, in response to, e.g., an administrator invoking appropriate commands to generate the new data container, such as a volume or lun. Alternately, in step 510, one or more of the data blocks at the previously created data container that are utilized in generating a signature may be modified, thereby causing a new signature to be created. As noted above, when data blocks that are utilized in generating a signature are modified, the signature is updated within the data container signature data structure 400. In step 515, the security appliance generates a signature of the data container. As noted above, the signature may be generated by reading certain blocks of the data container. Illustratively, the encrypted contents of the blocks is utilized in generating the signature. Alternately, the signature may comprise the results of processing certain blocks of the data container. For example, the security appliance may read five blocks of data and use the contents of the blocks to generate the signature. Thus, the signature would then comprise ABCDE, wherein A represent the contents of the first block used, B the second, etc. Alternately, the signature may comprise A'B'C'D'E', wherein A' represents the result of processing the contents of the first block by, e.g., hashing it. Illustratively, the blocks selected for use in generating a signature are not modified frequently, as any modification results in a new signature being generated. It should be noted that the number of blocks read may vary as desired to ensure uniqueness with, e.g., additional blocks resulting in a lower probability of differing data containers having the same signature.

The security appliance then associates the signature of the data container with the appropriate encryption key in step 520. This may be accomplished by, e.g., creating an appropriate entry 405 in a data container signature data structure 400. The security appliance then stores the signature of the data container and the associated encryption key in step 525 by, e.g., storing the entry 405 within the data structure 400. The procedure then completes in step 530.

Figure 6:
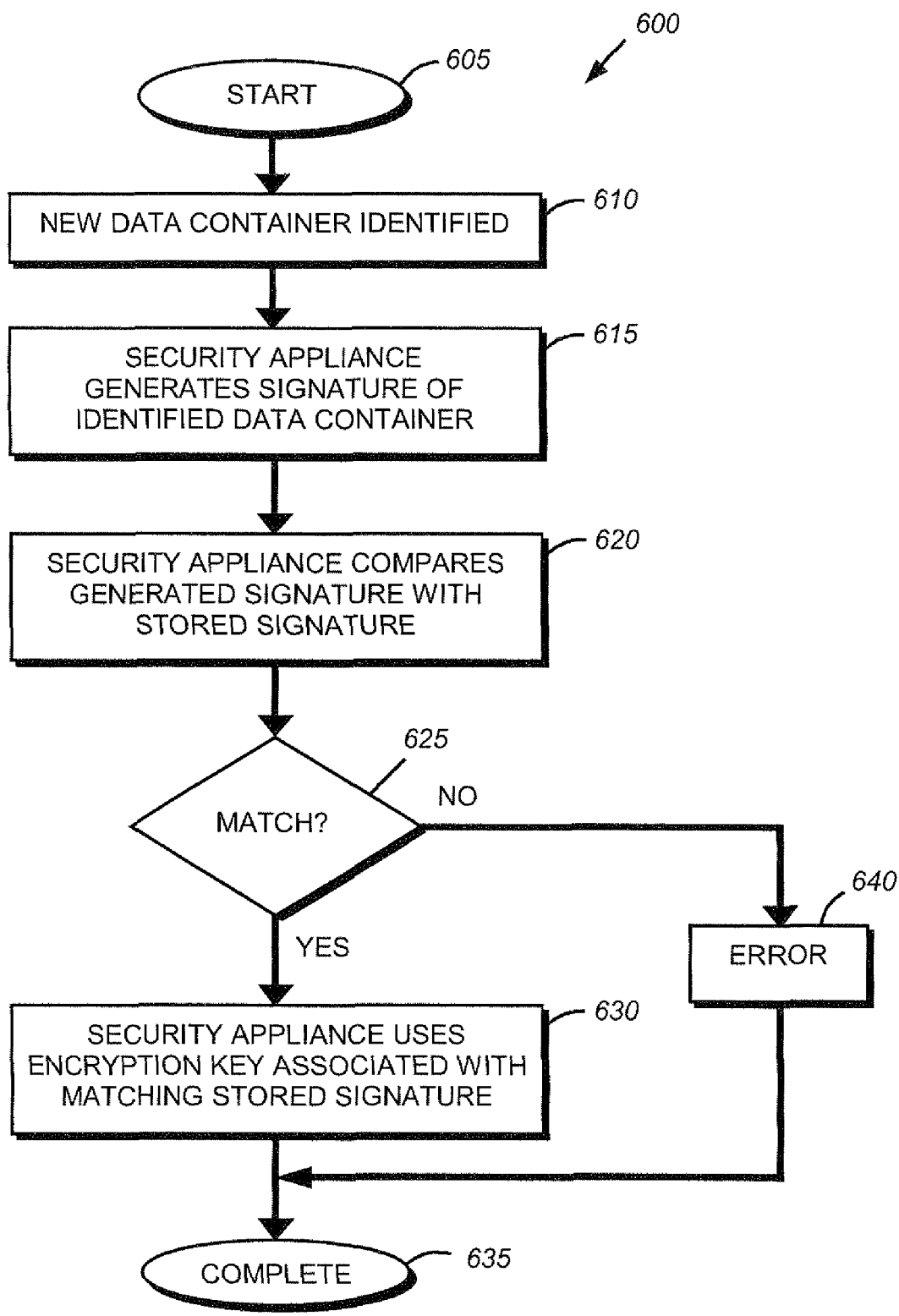
FIG. 6 is a flowchart detailing the steps of a procedure for performing signature based data container recognition in accordance with an illustrative embodiment of the present invention.

FIG. 6 is a flowchart detailing the steps of a procedure 600 for performing signature base data container recognition in accordance with an illustrative embodiment of the present invention. The procedure 600 begins in step 605 and continues to step 610 where a new data container is identified by, e.g., an administrator mounting a volume, exporting a lun, etc. In storage systems that support point in time images, such as snapshots or persistent consistency point images (PCPIs), a data container may be identified when a point in time image is restored to the active file system. In step 615 the security appliance generates a signature of the newly identified data container. Generation of the signature preferably utilizes the same technique as generation of the signature in step 515 above, e.g., reading a set of blocks of the data container and/or processing a set of blocks to generate the signature. The security appliance compares the generated signature with stored signatures in entries 405 of the data container signature data structure 400 in step 620 and determines in step 625 whether a match has occurred.

A match may occur when, e.g., all block signature fields 410 match the corresponding blocks of the data container. Alternately, the security appliance may be configured to enable an X of Y matching technique. In such a technique, as long as X of the Y total blocks match, the overall signature is deemed to match. Thus, for example, only 3 of 5 block signature fields 410 may need to match the newly identified data container to cause a match to be declared. By increasing the number of blocks as part of the signature and increasing the number of matches required, an administrator may reduce the probability of false matches from occurring.

Should no match occur, the procedure branches to step 640 where an error message is generated before the procedure completes in step 635. However if a match occurs in step 625, the procedure 600 continues to step 630 where the security appliance uses the encryption key associated with the matching signature. The procedure then completes in step 635.

It should be noted that while the present invention is written in terms of a security appliance operating between one or more clients and one or more storage systems, the principles of the present invention may be implemented on other platforms. For example, the functionality of the present invention may be directly implemented on a storage system or on an intelligent disk system.

The foregoing description has been directed to specific embodiments of this invention. It will be apparent, however, that other variations and modifications may be made to the described embodiments, with the attainment of some or all of their advantages. For instance, it is expressly contemplated that the procedures, processes, layers and/or modules described herein may be implemented in hardware, software, embodied as a computer-readable medium having executable program instructions, firmware, or a combination thereof. Furthermore, the number of blocks of data and/or the hashing techniques utilized may be varied without departing from the scope of the present invention. Accordingly this description is to be taken only by way of example and not to otherwise limit the scope of the invention. Therefore, it is the object of the appended claims to cover all such variations and modifications as come within the true spirit and scope of the invention.

What is claimed is:

1. A computer-implemented method for signature based recognition of a data container, the method comprising:
creating, by a storage system associated with a security appliance, the data container; in response to creating the data container, generating, by the security appliance, a signature of the data container by examining encrypted contents of a plurality of the data blocks contained within the data container, wherein the signature is generated using a one-way function;
associating, by the security appliance, the generated signature with an encryption key by creating an entry in a data container signature structure;
storing, on the security appliance, the signature and associated encryption key for subsequent data container signature based recognition by storing the entry within the data;
generating a new signature, when data in any of the one or more blocks utilized as the signature is modified, wherein the new signature is stored by the security appliance.

2. The method of claim 1 wherein the data container comprises a block addressable unit.

3. The method of claim 1 wherein the signature of the data container comprises data contained in one of more blocks of the data container.

4. The method of claim 1 wherein generating a signature of the data container further comprises processing data contained in the plurality of blocks contained within the data container.

5. The method of claim 4 wherein processing data contained in the plurality of blocks contained within the data container comprises hashing the data contained in the plurality of blocks contained within the data container.

6. The method of claim 1 wherein storing the signature and associated encryption key comprises storing a data container signature data structure.

7. The method of claim 6 wherein the data container signature data structure comprises at least one block signature field and an encryption key field.

8. The method of claim 1 further comprising: identifying a new data container; generating a signature of the new data container; comparing the generated signature of the new data container with the stored signature.

9. The method of claim 7 further comprising in response to the generated signature of the new data container matching the stored signature, utilizing the encryption key associated with the stored signature for operations directed to the new data container.

10. A non-transitory computer readable medium containing executable program instructions executed by a processor, comprising: program instructions that create, on a storage system associated with a security appliance, a data container; program instructions that generate a signature of the data container on the security appliance by examining encrypted contents of a plurality of the data blocks contained within the data container in response to the creation of the data container; wherein the signature is generated using a one-way function; program instructions that associate the generated, on the security appliance, signature with an encryption key by creating an entry in a data container signature structure; program instructions that store, on the security appliance, the signature and associated encryption key for subsequent data container signature based recognition by storing the entry within the data container signature data structure; and program instructions that generates a new signature, when data in any of the one or more blocks utilized as the signature is modified, wherein the new signature is stored by the security appliance.

11. A system for signature based recognition of a data container, the system comprising: a processor, a storage system configured to export and create the data container; and a security appliance operatively interconnected with the storage system, the security appliance configured to generate a signature of the data container by examining encrypted contents of a plurality of the data blocks contained within the data container in response to the creation of the data container, wherein the signature is generated using a one-way function; associate the generated signature with an encryption key by creating an entry in a data container signature structure and store the generated signature and associated encryption key for subsequent data container signature based recognition by storing the entry within the data container signature data structure; generating a new signature, when data in any of the one or more blocks utilized as the signature is modified, wherein the new signature is stored by the security appliance.

12. The system of claim 11 wherein the security appliance is further configured to store the generated signature and associated encryption key in a data container signature data structure.

13. The system of claim 12 wherein the data container signature data structure is stored in a key management system.

14. The system of claim 12 wherein the data container signature data container is stored in a configuration database.

15. The system of claim 12 wherein the data container signature data structure comprises at least one block signature field and an encryption key field.

16. The system of claim 11 wherein the data container comprises a block addressable unit.

17. The system of claim 11 wherein the generated signature comprises data contained in one of more blocks of the data container.

18. The system of claim 11 wherein the generated signature comprises processed data contained in the plurality of blocks contained within the data container.

19. The system of claim 18 wherein the processed data contained in the plurality of blocks contained within the data container comprises a hash value associated with the data in the plurality of blocks contained within the data container.

20. The system of claim 11 wherein the security appliance is further configured to identify a new data container, generate a signature of the new data container and compare the generated signature of the new data container with the stored signature.

* * * * *